Feb. 6, 1945.  E. MAYER  2,369,067
MOLD
Filed April 8, 1941  7 Sheets-Sheet 1

Inventor:
Ernest Mayer,

Feb. 6, 1945.  E. MAYER  2,369,067
MOLD
Filed April 8, 1941  7 Sheets-Sheet 2

Inventor:
Ernest Mayer,

Feb. 6, 1945.  E. MAYER  2,369,067
MOLD
Filed April 8, 1941  7 Sheets-Sheet 3

Inventor:
Ernest Mayer,

Feb. 6, 1945.  E. MAYER  2,369,067
MOLD
Filed April 8, 1941  7 Sheets-Sheet 5

Feb. 6, 1945.   E. MAYER   2,369,067
MOLD
Filed April 8, 1941   7 Sheets-Sheet 7

Inventor:
Ernest Mayer,
By Frank S. Appleman,
Attorney.

UNITED STATES PATENT OFFICE 2,369,067

MOLD

Ernest Mayer, Leipzig, Germany; vested in the Alien Property Custodian

Application April 8, 1941, Serial No. 387,531
In Germany November 25, 1939

16 Claims. (Cl. 22—124)

This invention relates to a mold for air-cooled ribbed cylinders, cylinder heads, or similar ribbed work.

It has been the prevailing practice hitherto to cast objects of this class in two-part molds produced with the aid of patterns. The production of such molds is, however, quite bothersome, protracted and difficult and requires a skilled molder. Furthermore, as the narrow gaps between the ribs of the pattern prohibit tamping down of the molding sand the latter must be loosely thrown in, and the riblike mold parts have to be fitted with a large number of pins which often get out of line and have to be knocked out during cleaning whereby the casting may be damaged. The use of an ordinary mold involves, moreover, the drawback that a cylinder cast therein has a seam running around it and its appearance is as a rule not satisfactory. The half ribs are usually displaced relative to each other at the seams, and the casting is seldom accurate to size, because the pattern cannot be smoothly removed from the mold, particularly if the ribs are closely arranged and possess a slight wall thickness to insure effective cooling. Special difficulties have also to be overcome at present in cleaning a casting fitted with closely adjacent thin ribs which break off easily, so that relatively much waste occurs. The necessity of getting the pattern out of the mold restricts the possibilities of shaping the part to be cast, and for this reason the shape and arrangement most favorable for instance to cooling must often be sacrificed.

It is known to employ in the casting of cylinder heads provided with cooling ribs and intended for air-cooled engines a mold built up from superposed metallic core plates each pair of which forms the mold part corresponding to a rib and which are divided in axial direction of the cylinder, so that, owing to this longitudinal division, they can be withdrawn from the finished casting. A mold of this type, however, does not permit good shrinking of the casting and leaves therein a seam extending over the entire axial section. As the core plates have to be drawn out laterally, shaping of the ribs is restricted to a smooth form tapering off towards the outer edge, and during the removal of the plates, which must be done while the casting is still semiplastic, either the ribs or the casting is easily damaged.

Compared with the known art, the invention resides in providing for a mold of the type mentioned comprising flat superposed plates of which two adjacent ones form the mold part corresponding to a rib core members produced in the sand as undivided plates in consequence whereof the casting can shrink without impediments and has no seam. Apart from the very simple rib patterns required for the production of the core plates, no pattern for the casting is needed and the drawbacks connected with casting to pattern are eliminated. As the cores drop out by themselves and smooth surfaces are obtained, cleaning is greatly facilitated and often superfluous. Any desired shape may furthermore be imparted to the rib and casting, which is particularly suited for cooling, such as a cruciform, wavelike, etc., shape. The production of the mold requires only a few simple core boxes, core pins can be dispensed with entirely and in producing the mold parts limiting the hollow rib spaces the sand may be stamped in the usual manner. There is moreover no seam, since the parting lines coincide with the edges of the ribs. The manufacture of the mold is considerably speeded up, because the platelike core members can be produced by unskilled female operators and the building up of the mold from the plates does not offer any difficulties.

The platelike construction of the mold for an air-cooled engine cylinder or cylinder head provides moreover surprising possibilities for shaping the cooling ribs in an advantageous manner. For example, the ribs may be provided with reinforcing connecting flanges which may be formed also of metal bars inserted in the core plates. Other advantages afforded by a mold according to the invention comprise the saving effected in sand and the elimination of molding pins. The invention further permits the manufacture of the core plates from iron borings or from a mixture of iron borings and sand instead of from pure sand so as to vary at will the hardness, grain and smoothness of the casting. If the core plates are made entirely from iron borings the cast material will resemble a chilled casting.

According to the invention the sand core plates are further inserted in iron or metal holding means or produced in annular or platelike iron or metal holders whose outer circumference exactly corresponds to the hollow section of the molding box. The metal plates, which may be repeatedly used, insure good fitting and accurate guiding of the core plates in the molding box as well as the proper thickness of the latter, of the hollow molds for the ribs and of the ribs of the casting to be made.

In numerous instances the sand core plates each of which is set in a metal plate may be used without molding boxes, in which case the metal holding means constitute the box and the superposed plates need merely be secured in relative position. If intricate castings, as cylinder heads for air-cooled aircraft engines, are concerned whose ribs have different contours and are differently positioned relative to one another the core plates are combined into a mold in a one-part or multiple-part flask, the flask or its parts like the core plates or their metal holding means being provided with means, as projections, etc., for alining and supporting the core plates.

The invention makes it possible to cast two or more cylinders on top of each other in a single molding box and thereby to save an upper and a lower core which serve for holding the gate and the core for the bore.

The mold according to the invention may be used also for connecting by casting the ribs made by a separate process with the cylinder liner cast in the mold. To this end the ribs are inserted in the hollow spaces formed by two adjacent core plates in such manner that the inner edges project into the hollow mold space serving for forming the liner and during pouring of the metal are surrounded thereby. The mold may be employed also for casting the ribs around a finished liner to which they are secured by shrinking during cooling of the metal, the liner being inserted as core in the mold.

Other objects of the invention refer to details of construction, arrangement and production of the core plates limiting the hollow rib spaces, and to the effects resulting therefrom, as described in the specification.

The invention is illustrated by way of example in the accompanying drawings, in which.

Figure 1:
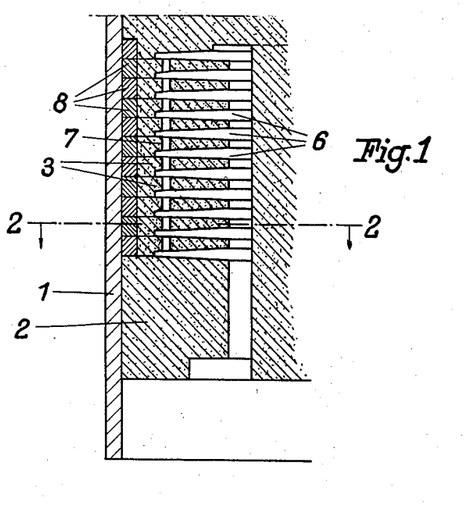
Figures 1 and 2 show a cylinder mold according to the invention, Fig. 1 being a vertical partial section in the direction of the cylinder axis and Fig. 2 a cross section on the line 2—2, of Fig. 1.
Figure 2:
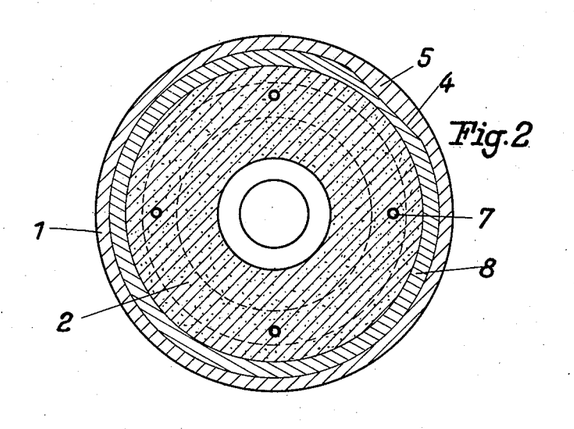

Figs. 1 to 4 show a mold in which in a cylindrical molding box 1 a number of platelike core members 3 are superposed on a core 2. The core members 3 are each made from sand in an annular metal plate 8 and with the air of these plates whose circumferential shape is accurately adapted to the hollow section of the box 1 inserted in the latter. To prevent turning the core plates 3 possess at one point of their circumference a flat portion 4 corresponding to a ledgelike axially parallel reinforcement 5 on the inside of the box 1, which has the same cross-sectional form as the flat portions of the plates, whose inner edge and side faces are so constructed that two adjacent plates always limit a hollow space 6 required for forming a casting rib, as indicated in Fig. 1.

At a slight distance from their outer edge the hollow spaces 6 are connected by openings 7 of the core plates 3, which serve for forming the connecting and reinforcing members between the ribs of the casting. These members may also be formed by bars of suitable material which are inserted in the openings 7.

Figure 3:
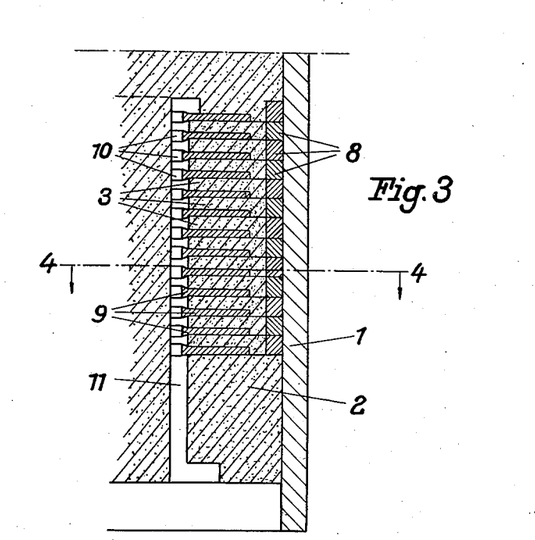
Figs. 3 and 4 show a mold according to the invention with inserted metal ribs, Fig. 3 being a partial section through the cylinder axis and Fig. 4 a cross section on the line 4—4, of Fig. 3.
Figure 4:
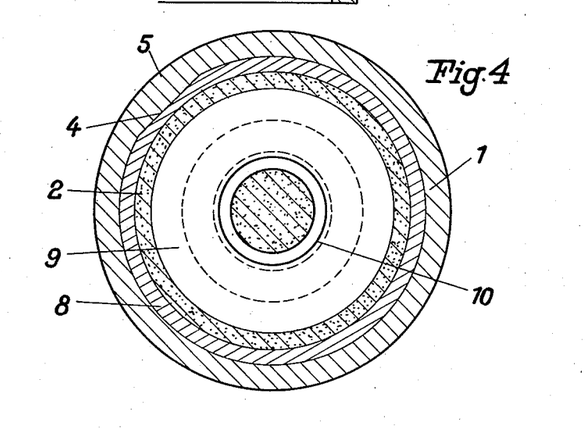

In the construction shown in Figs. 3 and 4 the hollow spaces serving for forming the ribs and limited by two core plates 3 are provided with inserted flat annular plates 9 whose outline and cross-sectional form exactly correspond to the shape of the ribs of the casting and which possess at their inner edge a projection 10 of dovetailed cross section, which extends into the hollow space 11 of the mold intended for forming the cylinder wall. During the casting operation the projections 10 are embedded in, or welded to, the cast metal of the cylinder wall.

Figure 5:
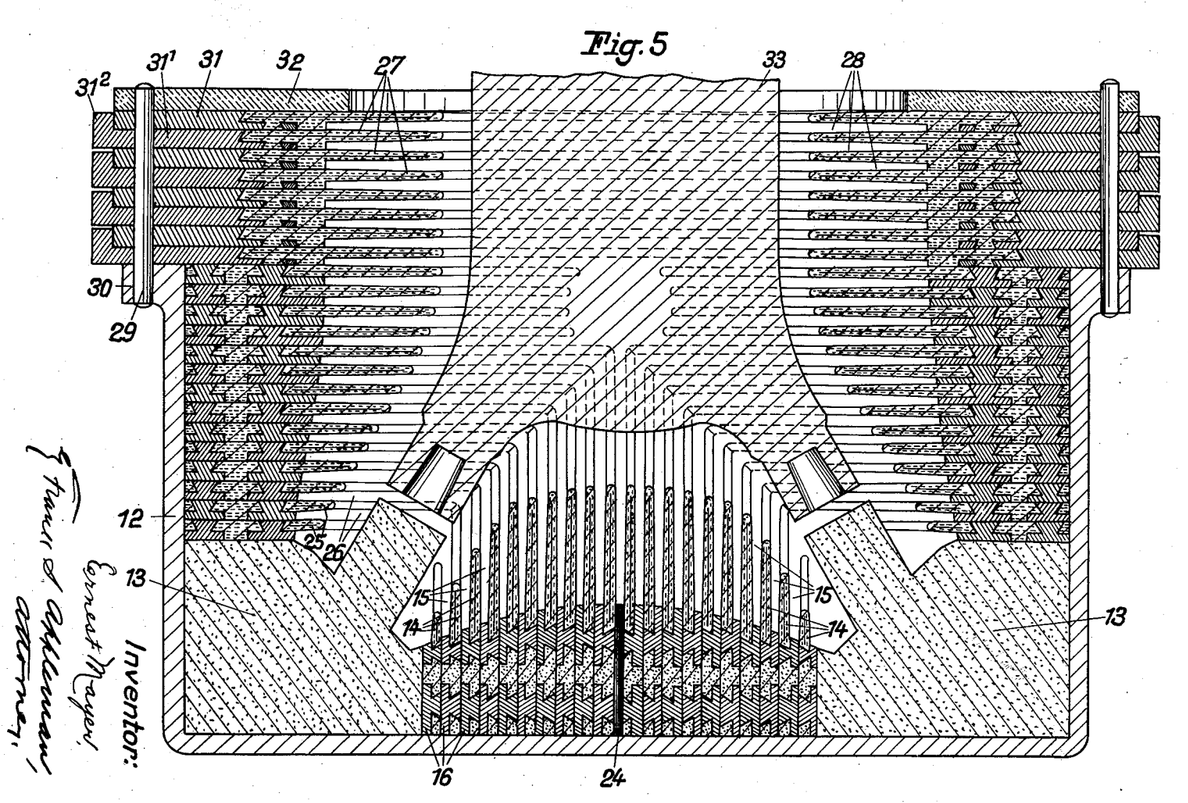
Fig. 5 is an axial section of a mold for casting a cylinder head.

The mold shown in Fig. 5 serves for a cylinder head having differently formed ribs in planes extending vertically to the cylinder axis and parallel to this axis, and comprises a molding box 12 shown undivided in Fig. 5, though it may be made up also of two or more parts united by screws. In the box 12 sand cores 13 for forming the hollow spaces for the casing receiving the valve control mechanism are inserted, and between these core members core plates 14 are arranged in upright position on the bottoms of the box 12, two of said plates always forming the hollow molds 15 for the axially parallel extending cooling ribs. Each sand core plate 14 is firmly united with a metal plate 16 whose outline coincides with that of the alining means of the box 12 and whose thickness generally corresponds to the thickness of the cast rib on the outer edge thereof.

Figure 6:
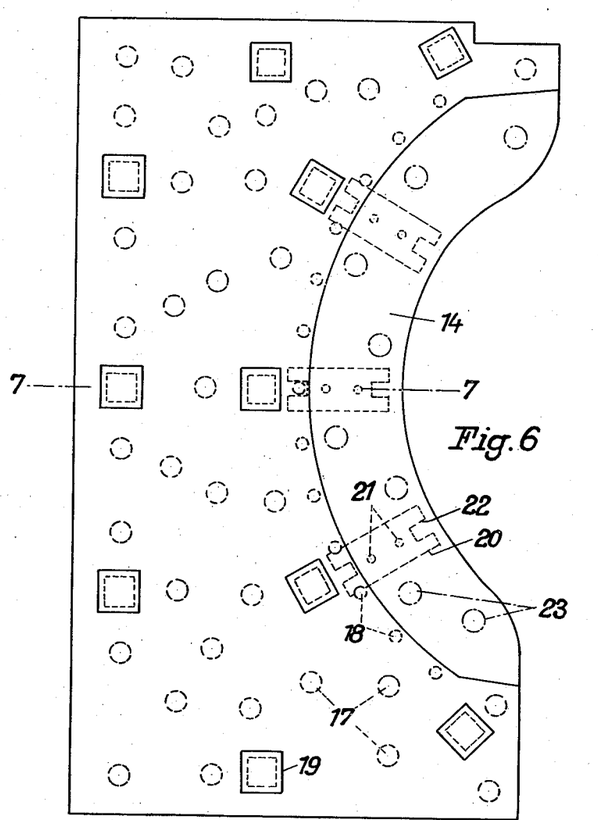
Figs. 6 to 17 are detail views, partly in elevation and partly in section, of the construction and arrangement of core plates.
Figure 7:
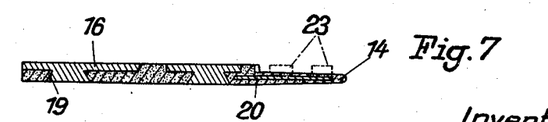

As indicated in Figs. 6 and 7, the sand core plates 14 are produced on a flat side of the metal plate 16. The sand core is firmly connected with the metal plate 16 by means of openings 17, 18 which are formed in the plate and may also be undercut to insure better anchoring of the sand, and of undercut projections 19 on the flat side where the sand core plate is formed, whose height together with the thickness of the plate 16 is equal to the spacing of the ribs plus the thickness thereof. The portion of the sand core plate 14 freely projecting beyond the inner edge of the metal plate 16 is preferably reinforced by radially disposed small metal plates 20 whose ends overlap the plate 16 and are provided with openings 21 and edge clearances 22.

For making the sand core plate 14 a pattern is used comprising a base plate which is flat as a rule and on which the rib pattern is secured. The base plate is fitted with alining stops for arranging thereon and alining the metal plate 16 which is placed on the base plate. In the mold thus formed the core plate is produced in known manner from white core sand with the aid of a plate or if necessary of a second pattern molding the top side of the core plate and after separation from the pattern united with the metal plate 16.

As indicated by dashes and dots in Figs. 6 and 7, the sand core parts projecting from the metal plate 16 can be supported relative to one another after assembling in the mold by means of projections 23 of rib thickness which are positioned on the sides thereof and produce holes in the cast ribs. The provision of projections 23 for supporting the projecting portions of the sand core plates 14 in the mold makes it possible in some instances to dispense with the metal insertions 20.

The pairs of core plates 14, 16 between the sand cores 13 have the same shape and are symmetrically arranged on both sides of a central rib, or of a hollow mold serving for forming it, whose thickness and form of edge are determined by a steel plate 24 inserted between the two adjoining core plates.

On the cores 13, or on the receiving ledges or projections provided on the insides of the walls of the molding box, sand core plates 25 are placed forming in pairs the hollow molds 26 of cast ribs which extend in planes disposed vertically to the cylinder axis and which meet at an angle the previously mentioned axially parallelly extending ribs. The core plates 25 are formed like the core plates 14, 16.

On the set of core plates 25 extending up to the surface of the molding box another set of core plates 27 is piled which form the hollow molds 28 of ribs extending in planes disposed vertically to the cylinder axis. On alining pins 29 inserted in a flange 30 of the molding box 12 the core plates 27 are placed with the openings provided in their metal plates 31, 31', and on the plates 27 a plate 32 is put which receives the mold top, not shown, holds the core 33 for the bore and is fitted with the usual gate and risers.

The metal plates 31, 31' are so arranged in pairs within one another that the lower plate 31' of each pair possesses on the outer edge an upwardly directed annular projection 31², and in the flat depression thus formed on the upper side of the plate 31' the other plate 31 is inserted. As the height of the projection 31² of the plate 31' is somewhat less than the thickness of the inserted plate 31, a small interstice through which gas and air can escape from the core plates exists between the top of the projection 31² and the underside of the next plate fitted with a projection. Otherwise, the core plates composed of the metal plates 31, 31' and the sand cores 27 are similarly arranged and produced as the previously described core plates made up from the metal plates 16 and the sand core plates 14 which are positioned parallel to the cylinder axis. The joining of the metal plates 31, 31' in pairs is advisable when the ribs have a small wall thickness and are slightly spaced to prevent distortion and deformation of the core plates whereby the accuracy to size of the casting would be affected. The arrangement described protects both plates, one by reinforcement of the edge and the other by being inserted in the first, against deformation.

Figures 8, 9:
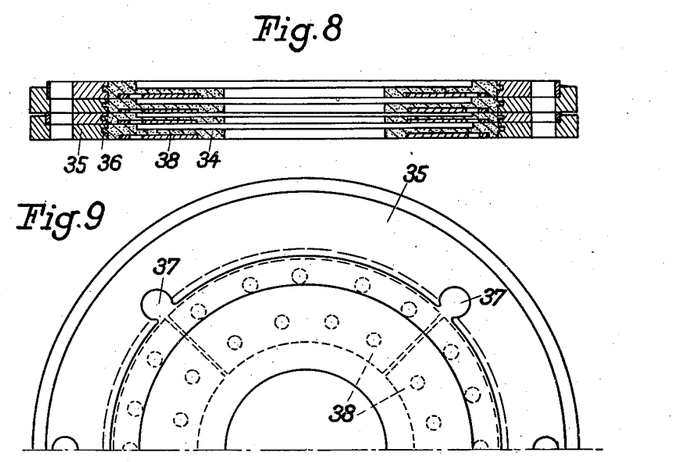

In the construction shown in Figs. 8 and 9 the sand cores 34 are anchored in their metal plates 35 by means of a groove 36 and of additional clearances 37 provided on the inner edge of the metal plates and fitted with reinforcements in the form of thin perforated metal plates. In the embodiment shown these reinforcements are constructed as ring sector plates 38 which when disposed on an outer side of the platelike sand cores 34 serve also for chilling the cast metal.

Figures 10, 11:
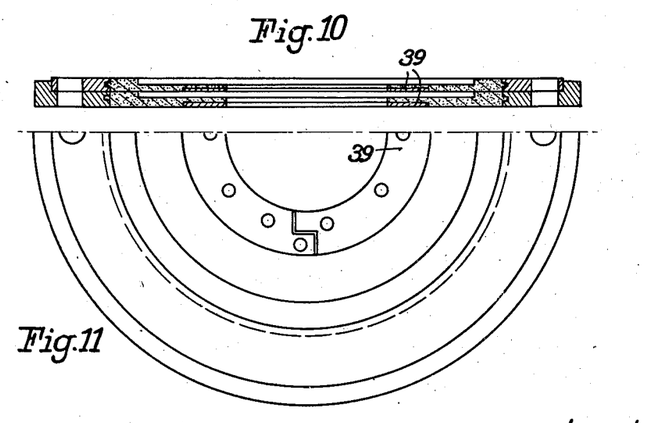

The construction of the core plate shown in Figs. 10 and 11 differs from the one just described only in so far as the reinforcements 39 are arranged so as to reinforce the inner edge of the sand core plate.

Further reinforcement of the thin-walled core plate is attained according to the invention by coating the finished and baked plate with linseed oil, dextrine, a sugar solution, colophony or similar hardenable substances.

Figures 12, 13:
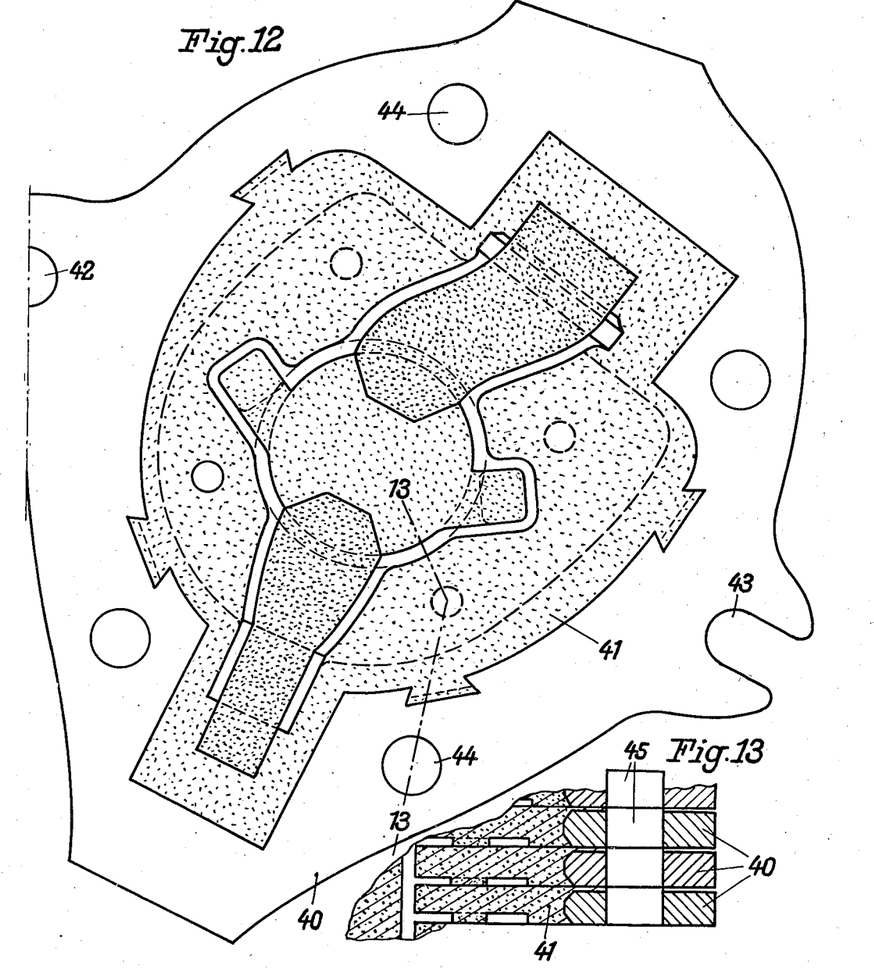

To insure accuracy to size of the casting in axial direction in spite of any possible deformation or wear of the metal plates during assembling of the mold from the various core plates, which is particularly important in case of cylinders for two-cycle engines, cylinder heads for air-cooled aircraft engines and all work pieces having control ports whose openings must be placed on an accurately determined level, the superposed core plates, if metal holding plates of less thickness than corresponds to the spacing plus thickness of the ribs are employed are relieved from the pressure produced by the assembling of the core plates by means of compression bars inserted in registering bores of the core plates. This arrangement is illustrated in Figs. 12 and 13 which show a core plate for an air-cooled two-cycle engine cylinder and a section through a number of superposed plates on the line 13—13, of Fig. 12. The metal holding plate 40 of the sand core plate 41 possesses a closed bore 42 and an edge clearance 43 for alining the core plates relative to one another. By inserting a rod in the clearances 43 subsequent alining of the plates is possible, so that in the building up of the mold the plates can be relatively displaced as required for the insertion of the cores. The metal plate 40 has four bores 44 which are in register in the superposed core plates after alinement. During construction of the mold, cylindrical members 45, Fig. 13, whose height is exactly like the spacing plus thickness of the ribs are inserted in the bores 44. In the finished mold the superposed members 45 form continuous compression bars or struts which relieve the core plates of the weight of the top and insure accuracy to size of the casting in axial direction. When the core plates are produced and used without metal holders, their openings 44 are preferably reinforced by inserted sleeves which may directly serve as spacing means 45. The bores 42 and the clearances 43 are also suitably provided with a metal lining.

The core plates shown in Figs. 14 to 17 differ from those described in that for the purpose of establishing a firmer union of the sand portion and the metal portion the edges of the metal plate connecting with the sand portion are fitted with pins whose projecting parts are embedded in the platelike sand core. In the core plate shown in Figs. 14 and 15 and serving for forming the hollow mold for a short ribbed piece of the kind used at the upper part of a cylinder head, Fig. 5, the metal plate 46 has a rectangular outer edge corresponding to the form of the molding box in which it is inserted. The inner edge has a polygonal form corresponding to the outer edge 47 of the rib 48 wheih is to be molded thereby. Into a side face of the metal plate 46 flat grooves 49 are cut which extend from the inner to the outer edge and serve for discharging air and gas from the sand mold. The polygonal inner edge of the metal plate 46 is undercut on both sides to clamp the edge of the sand core plate 53 to the metal plate. The edges 50, 51 of the plate 46 are bevelled so that the slope corresponds to the counter-templet.

The metal plates 46 are provided on their inner edge where the sand core plate 53 is connected with pins 52 partly projecting from the plates parallel with the sides thereof. The pins 52 are spaced approximately 20 mm., though this distance is preferably decreasing toward the outside in the plate shown in Fig. 14. When the holes for the pins 52 have to be drilled obliquely in places that are difficultly accessible, the projecting portions thereof are bent off into the plane of the plate.

Figures 14, 15:
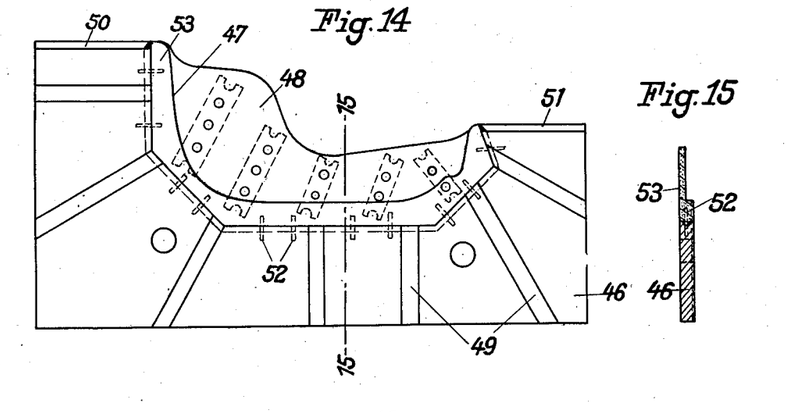

The sand core 53 connected with the pins 52 has the same thickness as the metal plate 46 from the point adjoining the inner edge of the metal plate up to the outer limiting line of the hollow rib space where the real core 48 connects which fills the space between the two ribs. The portion of the core plate made of sand is reinforced by armoring insertions.

Figure 16:
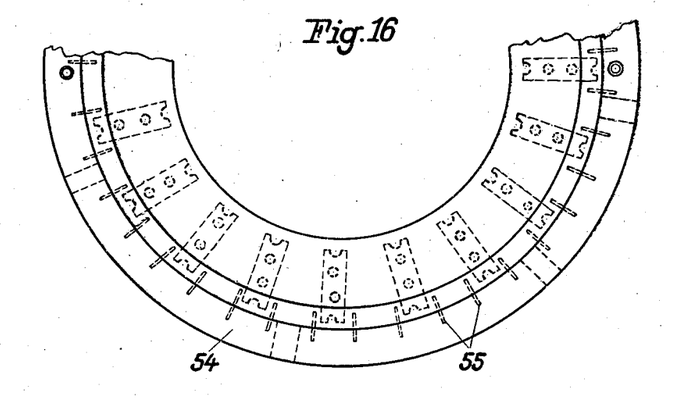
Figure 17:
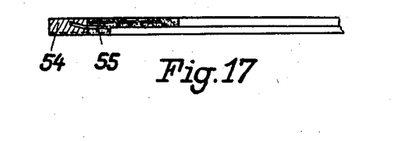

In the construction shown in Figs. 16, 17 the annular metal plate 54 having a thickness equal to the spacing plus thickness of the ribs is provided on the inner edge with pins 55 spaced about 20 mm. whose ends project approximately 5 mm. parallel with the side faces of the plate and are embedded in the sand core during connection of the sand core plate.

Fig. 17 shows the bending of the projecting pin portions into the plane of the annular plate when the holes in which the pins are inserted are drilled obliquely.

I claim:

1. A mold for ribbed work pieces, as cylinder and cylinder heads of air-cooled internal combustion engines, comprising annular core plates of sand having outer portions provided with parallel upper and lower faces, said core plates being of less thickness than at the parallel sided portions, metal frames of no greater thickness than the outer parts of the core plates and having parallel upper and lower faces, said outer parts of the core plates being in superposed contact, and means for alining and fixing the metal frames relative to one another.

2. A mold according to claim 1, in which the thin-walled sand core parts are reinforced by platelike metal insertions.

3. A mold according to claim 1, in which the thin-walled sand core parts are reinforced by platelike perforated metal insertions.

4. A mold according to claim 1, in which the thin-walled sand core parts are reinforced by platelike metal insertions having a shape adapted to the form of the ribs and arranged to act as chilling means.

5. A mold according to claim 1, in which the sand core plates are apertured.

6. A mold according to claim 1, in which the sand core plates are apertured and metal rods are inserted in the apertures.

7. A mold according to claim 1, in which the sand core plates are inserted in a molding box and both the core plates and the molding box are provided with means for alining and fixing the core plates.

8. A mold according to claim 1, in which the sand core plates are held in metal plates.

9. A mold according to claim 1, in which the sand core plates are held in metal plates and the metal holders are provided with means for alining and fixing the core plates relative to one another.

10. A mold according to claim 1, in which the sand core plates are held in metal plates and the metal holding plates are arranged in pairs in one another, so that one plate is reinforced at its outer edge by a projection and the other metal plate is inserted in the depression formed thereby.

11. A mold according to claim 1, in which the sand core plates are held in metal plates and means for relieving the core plates of pressure are provided.

12. A mold according to claim 1, in which the sand core plates are held in metal plates and the plates carrying the sand cores are so formed that their inner edges limit the rib mold.

13. A mold according to claim 1, in which the sand core plates are held in metal plates having approximately the thickness of a cast rib and the sand core plate is formed on one side of the metal plate.

14. A mold according to claim 1, in which the sand core plates are held in metal plates having approximately the thickness of a cast rib, the sand core plate is formed on one side of the metal plate and the metal plates are provided with undercut openings and/or projections for anchoring the molding sand.

15. A mold according to claim 1, in which the sand core plates are connected with metal plates and the core plate comprising a sand portion and a metal portion has a thickness equal to the spacing of the ribs plus the thickness of a rib.

16. A mold for ribbed work pieces, comprising core plates of sand, metal frames supporting and embracing the sand cores, the metal frames being in superposed contact, the adjacent sand core plates being spaced to provide a cast rib on the work pieces.

ERNEST MAYER.